United States Patent
Kim et al.

(10) Patent No.: US 8,980,464 B2
(45) Date of Patent: Mar. 17, 2015

(54) SEAL TAPE AND SECONDARY BATTERY USING THE SAME

(75) Inventors: Sung-Jong Kim, Daejeon (KR); Cha-Hun Ku, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/348,953

(22) Filed: Jan. 12, 2012

(65) Prior Publication Data

US 2012/0115025 A1 May 10, 2012

Related U.S. Application Data

(63) Continuation of application No. PCT/KR2010/008006, filed on Nov. 12, 2010.

(30) Foreign Application Priority Data

Oct. 4, 2010 (KR) .................. 10-2010-0096444
Nov. 12, 2010 (KR) .................. 10-2010-0112799

(51) Int. Cl.
H01M 2/08 (2006.01)
H01M 2/02 (2006.01)
H01M 10/04 (2006.01)

(52) U.S. Cl.
CPC ............ *H01M 2/08* (2013.01); *H01M 10/0468* (2013.01)
USPC ........... 429/173; 429/163; 429/164; 429/168; 429/174

(58) Field of Classification Search
None
See application file for complete search history.

(56) References Cited

U.S. PATENT DOCUMENTS

| | | | |
|---|---|---|---|
| 6,743,546 B1 * | 6/2004 | Kaneda et al. | 429/127 |
| 2002/0022180 A1 * | 2/2002 | Olsen et al. | 429/176 |
| 2004/0045597 A1 | 3/2004 | Kimijima et al. | |
| 2006/0019160 A1 | 1/2006 | Han | |
| 2006/0154138 A1 | 7/2006 | Miyamoto et al. | |
| 2007/0154787 A1 | 7/2007 | Jang et al. | |
| 2011/0008672 A1 * | 1/2011 | Kim | 429/174 |
| 2011/0091756 A1 | 4/2011 | Suzuki et al. | |
| 2011/0287302 A1 | 11/2011 | Kim | |

FOREIGN PATENT DOCUMENTS

| | | |
|---|---|---|
| JP | 06-181058 | 6/1994 |
| JP | 2001-093576 A | 4/2001 |
| JP | 2001-273933 A | 10/2001 |
| JP | 2003-151512 A | 5/2003 |
| JP | 2005-060412 A | 3/2005 |
| JP | 2006-196276 A | 7/2006 |

(Continued)

OTHER PUBLICATIONS

Machine translation of KR 1020080019311 retrieved from <http://kposd.kipo.go.kr:8088/up/kpion/> on Aug. 5, 2012.*

*Primary Examiner* — Cynthia K. Walls
(74) *Attorney, Agent, or Firm* — Lerner, David, Littenberg, Krumholz & Mentlik, LLP

(57) ABSTRACT

A seal tape capable of preventing an electrode assembly from moving in a secondary battery, and a secondary battery using the same are disclosed. The seal tape for a secondary battery is attached to the outer surface of the electrode assembly which is received in a battery case, and includes a first adhesive layer having an adhesive surface adhered to the outer surface of the electrode assembly, and a second adhesive layer having an adhesive layer at a side opposite to the first adhesive layer so as to adhere to the inner surface of the battery case.

11 Claims, 7 Drawing Sheets

(56) References Cited

FOREIGN PATENT DOCUMENTS

| | | |
|---|---|---|
| JP | 2011-243553 A | 12/2011 |
| KR | 10-0542677 | 1/2006 |
| KR | 100719725 B1 | 5/2007 |
| KR | 2007-0096649 A | 10/2007 |
| KR | 20080019311 A | 3/2008 |
| KR | 2009-0088761 A | 8/2009 |
| KR | 2011-004770 | 1/2011 |
| WO | 2009/139388 A1 | 11/2009 |

\* cited by examiner (a)  (b)

SEAL TAPE AND SECONDARY BATTERY USING THE SAME

CROSS-REFERENCE TO RELATED APPLICATION

This application is a continuation of International Application No. PCT/KR2010/008006 filed Nov. 12, 2010, which claims priority under 35 USC 119(a) to Korean Patent Application No. 10-2010-0096444 and filed in the Republic of Korea on Oct. 4, 2010 and Korean Patent Application No. 10-2010-0112799 filed in the Republic of Korea on Nov. 12, 2010, the entire contents of which are incorporated herein by reference.

TECHNICAL FIELD

The present disclosure relates to a secondary battery and a seal tape used for the same, and more particularly, to a seal tape attached to the outer surface of an electrode assembly to prevent the electrode assembly from being released or moved.

BACKGROUND ART

Generally, a secondary battery refers to a rechargeable battery, while a general battery refers to a non-rechargeable battery. Secondary batteries are widely used for electronic devices such as cellular phones, notebook computers, video cameras, electric vehicles, or the like. In particular, a lithium secondary battery has an operating voltage of about 3.6 V, triple the capacity of nickel-cadmium batteries or nickel hydrogen batteries generally used as power sources of electronic devices, and due to its high energy density per unit weight, are being utilized more and more.

The lithium secondary battery generally uses lithium oxide and carbonaceous material as cathode active material and anode active material, respectively. The lithium secondary battery includes an electrode assembly in which a cathode plate and an anode plate respectively coated with the cathode active material and the anode active material are disposed with a separator being interposed between them, and an exterior material which seals and receives the electrode assembly together with an electrolyte.

Meanwhile, the lithium secondary battery may be classified into a can type secondary battery where the electrode assembly is included in a metal can and a pouch type battery where the electrode assembly is included in a pouch of an aluminum laminate depending on the shape of the battery case. In addition, the can type secondary battery may further be classified into a cylindrical battery and a rectangular battery depending on the shape of the metal can.

The electrode assembly is classified into a jelly roll type electrode assembly where a separator is interposed between the cathode plate and the anode plate and then rolled, and a stack type electrode assembly where separators are interposed between a plurality of cathode plates and anode plates with a predetermined size and then successively laminated. The stack type electrode assembly is generally used for a pouch type battery, and the jelly roll type electrode assembly is generally used for a can type secondary battery. In particular, the jelly roll type electrode assembly is widely used due to its advantages such as easy fabrication, high energy density per weight, and easy storage in a cylindrical or rectangular battery can.

In the jelly roll type electrode assembly, also called "jelly roll" due to its shape, the cathode plate, the anode plate and the separator are laminated and rolled. Here, a seal tape is attached to the outermost terminal or a rolling end of the electrode assembly, so that the electrode assembly may maintain its rolled state without being released. In addition, the electrode assembly to which the seal tape is attached as described above is received in a metal can together with an electrolyte, and a cap assembly having an electrode terminal is coupled to the upper opening end of the battery case.

However, the secondary battery having the above configuration has a problem in that the electrode assembly may move vertically or horizontally in the battery if the battery falls or external impact is applied thereto. Such movement of the electrode assembly may cut a tap connected between the electrode assembly and the cap assembly, which may cause a power insensitive phenomenon of the secondary battery. In addition, the vertical movement of the electrode assembly presses the upper or lower portion of the electrode assembly to deform the electrode assembly and cause a short circuit, which may break the secondary battery and lead to accidents such as firing or explosion, causing great damage. Moreover, the vertical movement of the electrode assembly may give impact to the cap assembly coupled to the upper opening portion of the secondary battery, causing the sealing portion to break or separate, which may lead to the electrolyte in the secondary battery to leak.

DISCLOSURE

Technical Problem

The present disclosure is designed to solve the problems of the prior art, and therefore it is an object of the present disclosure to provide a seal tape capable of preventing an electrode assembly from moving in a secondary battery, and a secondary battery using the same.

Other objects and advantages of the present disclosure will be understood from the following description and become more apparent by embodiments of the present disclosure. In addition, it could be easily understood that the objects and advantages of the present disclosure can be implemented by means and their combinations defined in the claims.

Technical Solution

According to an embodiment of the present disclosure, there is provided a seal tape for a secondary battery, which is attached to an outer surface of an electrode assembly, which is received in a battery case, the seal tape including: a first adhesive layer having an adhesive surface adhered to the outer surface of the electrode assembly; and a second adhesive layer having an adhesive surface at a side opposite to the adhesive surface of the first adhesive layer so as to adhere to an inner surface of the battery case.

Preferably, the second adhesive layer exhibits an adhesive property by reacting with an electrolyte of the secondary battery.

More preferably, the second adhesive layer is made of oriented polystyrene (OPS) material.

Also preferably, the seal tape further includes a protective layer formed on the second adhesive layer, wherein the protective layer is entirely or partially removed by reacting with an electrolyte of the secondary battery.

According to another embodiment of the present disclosure, there is also provided a secondary battery, which includes: an electrode assembly including a cathode plate and an anode plate disposed with a separator being interposed between them; a battery case receiving the electrode assembly and an electrolyte; and a seal tape having a first adhesive layer adhered to an outer surface of the electrode assembly and a second adhesive layer with an adhesive surface formed at a side opposite to the adhesive surface of the first adhesive layer so as to adhere to an inner surface of the battery case.

Preferably, the second adhesive layer exhibits an adhesive property by reacting with the electrolyte.

More preferably, the second adhesive layer is made of OPS material.

Also preferably, the seal tape further includes a protective layer formed on the second adhesive layer and is entirely or partially removed by reacting with the electrolyte.

Advantageous Effects

According to the present disclosure, it is possible to prevent the electrode assembly in a rolled state from being released in the secondary battery and to prevent the electrode assembly from moving in the battery case.

Therefore, it is possible to prevent a power insensitive phenomenon which can be caused by the movement of the electrode assembly cutting the electrode lead connected to the cap assembly.

In addition, by preventing the impact applied to the upper or lower portion of the electrode assembly due to the movement of the electrode assembly, it is possible to prevent the secondary battery from damaging or causing accidents such as firing or explosion due to the short circuit caused by deformation of the electrode assembly.

Further, in an embodiment of the present disclosure, when the seal tape is impregnated with the electrolyte in the secondary battery, the seal tape swells. In this case, the swelling seal tape may play a role of absorbing the impact transferred from the outside of the secondary battery to the electrode assembly. Therefore, the electrode assembly may be more stably protected.

In addition, according to the present disclosure, by preventing the impact applied to the cap assembly due to the vertical movement of the electrode assembly, the breaking of the coupling portion between the cap assembly and the battery case can be prevented. Therefore, it is possible to prevent the electrolyte from leaking caused by the damage of the coupling portion of the cap assembly.

DESCRIPTION OF DRAWINGS

Other objects and aspects of the present disclosure will become apparent from the following descriptions of the embodiments with reference to the accompanying drawings in which.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
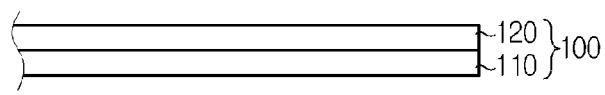
FIG. 1 is a cross-sectional view schematically showing a seal tape for a secondary battery according to an embodiment of the present disclosure.

FIG. 1 is a partial cross-sectional view schematically showing a seal tape 100 for a secondary battery according to an embodiment of the present disclosure.

Referring to FIG. 1, the seal tape 100 for a secondary battery according to the present disclosure includes a first adhesive layer 110 and a second adhesive layer 120.

The first adhesive layer 110 is a layer formed on one surface of the seal tape 100 so that it may adhere to the outer surface of an electrode assembly. In a case where the seal tape 100 is attached to an electrode assembly, the adhesive surface of the first adhesive layer 110 directly adheres to the outer circumference of the electrode assembly. The first adhesive layer 110 is made of adhesive material generally used in seal tapes of a secondary battery, or various kinds of other adhesive material may also be used. The first adhesive layer 110 adhered to the electrode assembly is well known in the art and not described here in detail. In addition, the present disclosure is not limited to the material or manufacturing method of the first adhesive layer 110, and various kinds of adhesive materials known in the art at the filing of this application may be used as the material of the first adhesive layer 110.

The second adhesive layer 120 is an adhesive layer having an adhesive surface at a surface opposite to the adhesive surface of the first adhesive layer 110. Due to the second adhesive layer 120, the seal tape 100 for a secondary battery according to the present disclosure is formed to have adhesive layers on both surfaces, different from a general seal tape for a secondary battery which has an adhesive layer on only one surface. The second adhesive layer 120 is configured so that its adhesive surface directly contacts and adheres to the inner surface of the battery case in a case where the electrode assembly is received in the battery case.

The second adhesive layer 120 may be made of the same adhesive material as the first adhesive layer 110. Therefore, even though the figures of the first adhesive layer 110 and the second adhesive layer 120 distinguishably are configured to illustrate the separate layers for the sake of convenience, in a case where the second adhesive layer 120 and the first adhesive layer 110 are made of the same adhesive material, they may be in the form of a indistinguishable single adhesive layer.

Meanwhile, the second adhesive layer 120 may be made of adhesive material different from the first adhesive layer 110.

Preferably, the second adhesive layer 120 exhibits an adhesive property by reacting with the secondary battery. In other words, the second adhesive layer 120 of the seal tape 100 does not have an adhesive property before it reacts with the electrolyte, but preferably has an adhesive property after it reacts with the electrolyte. According to this embodiment, when the electrode assembly to which the seal tape 100 is attached is inserted into a battery case, the adhesive property of the second adhesive layer 120 is not exhibited, and the adhesive property of the second adhesive layer 120 is exhibited only after the electrode assembly is inserted into the battery case and the electrolyte is injected thereto. Therefore, the electrode assembly to which the seal tape 100 is attached may be easily inserted into the battery case.

More preferably, the second adhesive layer 120 is made of oriented polystyrene (OPS). In other words, the second adhesive layer 120 may be an OPS film. In a case where the second adhesive layer 120 is an OPS film as described above, the second adhesive layer 120, namely the OPS film, does not have an adhesive property, but it may have an adhesive property when reacting with a certain component of the electrolyte, for example dimethyl carbonate (DMC). In more detail, the OPS film is a solid film and generally does not have an adhesive property. However, if the OPS film reacts with the DMC, the DMC penetrates the pores of the polymer chains so that the polymer chains changes to a movable state allowing easy movement and has an adhesive property. In other words, the OPS film reacts with the DMC to shift its phase from a solid state to a viscous liquid state, which gives an adhesive property. Therefore, in a case where an electrolyte is injected into the battery case, in which the electrode assembly to which the seal tape 100 is attached is inserted, the adhesive property of the OPS film is exhibited, which allows the adhesion with the inner surface of the battery case.

Meanwhile, the OPS film, which has reacted with the electrolyte to shift its phase into a viscous liquid state as described above, may start a shrinking reaction by thermal treatment of about 60° C. and become slowly solidified while losing the solvent component little by little. Therefore, in a case where the second adhesive layer 120 is made of an OPS film like the above embodiment, the OPS film may be solidified again by performing a thermal treatment process, a predetermined time after the electrolyte is injected into the battery case. At this time, the thermal treatment process may be a process included in an existing secondary battery manufacturing process or an additional separate process.

In addition, even though it has been illustrated that the component of the electrolyte reacting with the OPS film to exhibit an adhesive property of the OPS film is the DMC, it is merely just an example, and the OPS film may exhibit its adhesive property by means of other nonpolar solvents such as toluene and xylene.

Meanwhile, in a case where the second adhesive layer 120 is made of an OPS film like in the above embodiment, the first adhesive layer 110 may substantially have a thickness of 7 um, and the second adhesive layer 120 may substantially have a thickness of 40 um. However, the thicknesses of the first adhesive layer 110 and the second adhesive layer 120 are just an example, and the present disclosure is not limited to such specific thicknesses of the first adhesive layer 110 and the second adhesive layer 120. The thickness of the entire seal tape 100, or the thickness of the first adhesive layer 110 or the second adhesive layer 120 may be suitably determined according to various factors such as the kinds of the first adhesive layer 110 and the second adhesive layer 120, the size or rolling shape of the electrode assembly, the kind of electrolyte, the size and capacity of the battery case, the size or manufacturing process of the secondary battery, or the like.

In addition, the second adhesive layer 120 may be made of thermosetting adhesive material which exhibits an adhesive property when heat more than a predetermined level is applied. In this case, when the electrode assembly is inserted into the battery case, the adhesive property of the second adhesive layer 120 is not exhibited so that the electrode assembly may be inserted into the battery case without any disturbance from the second adhesive layer 120. In addition, after the electrode assembly is inserted into the battery case, heat more than the predetermined level is applied to the seal tape 100 so that the second adhesive layer 120 exhibits an adhesive property, which allows the second adhesive layer 120 to adhere to the inner surface of the battery case. The heat applying process as described above may be included in an existing secondary battery manufacturing process or may be separately added. According to this embodiment, the electrode assembly to which the seal tape 100 is attached may be more easily received in the battery case.

Figure 2:
FIG. 2 is a cross-sectional view schematically showing a seal tape for a secondary battery according to another embodiment of the present disclosure.

FIG. 2 is a partial cross-sectional view schematically showing a seal tape 100 for a secondary battery according to another embodiment of the present disclosure.

As shown in FIG. 2, the seal tape 100 for a secondary battery according to the present disclosure may further include a protective layer 130 on the second adhesive layer 120.

The protective layer 130 is a non-adhesive layer with no adhesive property and prevents the second adhesive layer 120 from being exposed out on the second adhesive layer 120. In a state where the protective layer 130 is present on the second adhesive layer 120 so that the second adhesive layer 120 is not exposed as described above, the seal tape 100 has a shape similar to a single-surface adhesive tape. Therefore, when the electrode assembly to which the seal tape 100 is attached is inserted into the battery case, it is possible to prevent the insertion process of the electrode assembly from being disturbed due to the adhesive property of the second adhesive layer 120.

In addition, the protective layer 130 reacts with the electrolyte of the secondary battery and is entirely or partially removed. In other words, when the electrode assembly to which the seal tape 100 is attached is received in the battery case together with the electrolyte, the protective layer 130 at the periphery of the seal tape 100 may react with the electrolyte of the protective layer 130 at the outer location so that it is entirely or partially removed. For example, the protective layer 130 may be removed by reacting with the DMC of the electrolyte. If the protective layer 130 is removed by reacting with the electrolyte as described above, the seal tape 100 converts from the single-surface adhesive tape form to a double-surface adhesive tape form.

Figure 3:
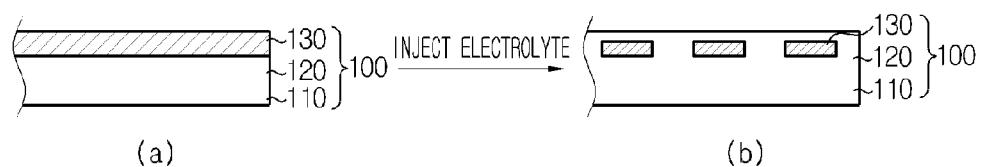
FIG. 3 is a cross-sectional view schematically showing a protective layer of the seal tape that is partially removed by reacting with an electrolyte, according to an embodiment of the present disclosure.

FIG. 3 is a cross-sectional view schematically showing a protective layer 130 of the seal tape 100 that is partially removed by reacting with an electrolyte, according to an embodiment of the present disclosure. In FIG. 3, (a) shows the seal tape 100 before it reacts with the electrolyte of the secondary battery, and (b) shows the seal tape 100 after it reacts with the electrolyte of the secondary battery. In addition, in FIG. 3, the first adhesive layer 110 and the second adhesive layer 120 are depicted as a single layer on the assumption that they are made of the same adhesive material.

Referring to FIG. 3, before it reacts with the electrolyte, the protective layer 130 is present on the entire upper portion of the second adhesive layer 120, which is an adhesive surface, and so the second adhesive layer 120 may not be exposed out. For this reason, the adhesive characteristic of the second adhesive layer 120 may not be exhibited. However, if the seal tape 100 reacts with the electrolyte, at least a part of the protective layer 130 is removed. At this time, the second adhesive layer 120 may be exposed out through the removed portion of the protective layer 130. Therefore, the adhesive characteristic of the second adhesive layer 120 may be exhibited, and at this time it may adhere to an adjacent object, for example the inner surface of the battery case.

Further, the second adhesive layer 120 may increase its movement by applying an amount more than the predetermined level thereto or contacting the electrolyte during the secondary battery manufacturing process, so that the adhesive material of the second adhesive layer 120 may leak through the region where the protective layer 130 is removed as shown in FIG. 3. Therefore, the adhering area of the second adhesive layer 120 may further increase. In this case, the adhesive force of the second adhesive layer 120 may further improve.

Meanwhile, even though FIG. 3 shows that the protective layer 130 is partially removed by reacting with the electrolyte, it is also possible that the protective layer 130 is entirely removed by reacting with the electrolyte. In this case, as shown in (a) of FIG. 3, the seal tape 100 may have a similar shape as shown in FIG. 1 as the protective layer 130 is entirely removed by reacting with the electrolyte. Therefore, the entire adhesive surface of the second adhesive layer 120 may be exposed thereby contacting the battery case.

Preferably, the protective layer 130 may entirely or partially have an adhesive property by reacting with the electrolyte. In other words, the protective layer 130 does not have an adhesive property before it reacts with the electrolyte but has an adhesive property by reacting with the electrolyte so that it may serve as an adhesive layer. Therefore, when the electrode assembly to which the seal tape 100 is attached is inserted into the battery case, the adhesive characteristic of the protective layer 130 is not exhibited so that the inserting process may be easily performed, and if the electrolyte is inserted after the electrode assembly is inserted, the adhesive characteristic of the protective layer 130 may be exhibited so that the protective layer 130 adheres to the inner surface of the battery case.

The present disclosure is not limited to the detailed material of the protective layer 130, and various kinds of polymer material may be used for the protective layer 130.

Preferably, the protective layer 130 may be made of OPS material. Such an OPS protective layer 130 may be attached onto the second adhesive layer 120 of the seal tape 100 in an OPS film form and then, by the DMC contained in the electrolyte, dissolve or be removed when reacting with the electrolyte. Therefore, the second adhesive layer 120 located below the OPS protective layer 130 may be exposed thereby contacting the battery case. In addition, the OPS protective layer 130 may have an adhesive property just by being dissolved by the DMC.

In addition, the protective layer 130 may have various thicknesses. In other words, the protective layer 130 may have various thicknesses according to the material of the protective layer 130, the thicknesses of the first adhesive layer 110 and the second adhesive layer 120, the size or rolled state of the electrode assembly, the kind of the electrolyte, the size or capacity of the battery case, the size or manufacturing process of the secondary battery, or the like.

Figure 4:
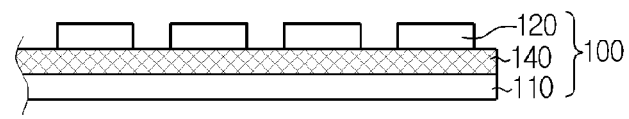
FIG. 4 is a cross-sectional view schematically showing a seal tape for a secondary battery according to still another embodiment of the present disclosure.

FIG. 4 is a partial sectional view schematically showing a seal tape 100 for a secondary battery according to still another embodiment of the present disclosure.

Referring to FIG. 4, the seal tape 100 for a secondary battery according to the present disclosure may further include a substrate layer 140 between the first adhesive layer 110 and the second adhesive layer 120. The substrate layer 140 is a non-adhesive layer interposed between the first adhesive layer 110 and the second adhesive layer 120, and the present disclosure is not limited to the material or shape of the substrate layer 140. For example, the substrate layer 140 may be made of various kinds of material. In more detail, the substrate layer 140 may be made of polymer material such as polypropylene, polyethylene or polyimide. In addition, the substrate layer 140 may have various thicknesses according to the size or manufacturing process of the secondary battery, the size of the electrode assembly, the thicknesses of the first adhesive layer 110 and the second adhesive layer 120, the presence or thickness of the protective layer 130, the capacity of the battery case, or the like. For example, the thickness of the substrate layer 140 may be determined so that the entire thickness of the first adhesive layer 110, the substrate layer 140 and the second adhesive layer 120 becomes 50 um.

Meanwhile, the adhesive surface of the second adhesive layer 120 may have a shape different from the adhesive surface of the first adhesive layer 110. For example, as shown in FIG. 4, the size of the adhering area of the second adhesive layer 120 may be smaller than the size of the adhering area of the first adhesive layer 110. Further details regarding the shapes of the second adhesive layer 120 will be described with reference to FIGS. 5 to 7.

Figure 5:
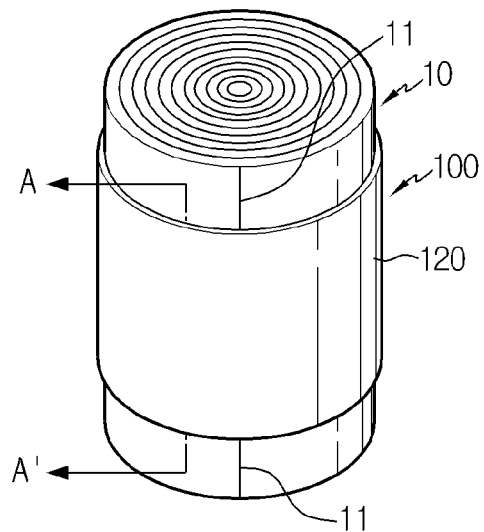
FIG. 5 is a schematic view showing the seal tape attached to an electrode assembly according to an embodiment of the present disclosure.

FIG. 5 is a schematic view showing the seal tape 100 attached to an electrode assembly 10 according to an embodiment of the present disclosure Referring to FIG. 5, the seal tape 100 for a secondary battery is attached to entirely or partially surround the outer circumference of the electrode assembly 10 having a rolling end 11 of the electrode assembly 10 rolled in a jelly roll shape. Since the rolling end 11 of the electrode assembly 10 is fixed by the seal tape 100 as described above, the electrode assembly 10 is not released but maintains the rolled state.

As shown in FIG. 5, the second adhesive layer 120 of the seal tape 100 may have the same shape and size as the first adhesive layer 110. In this case, only the second adhesive layer 120 of the seal tape 100 attached to the electrode assembly 10 is exposed out. If the second adhesive layer 120 is formed on the entire area of the seal tape 100 as described above, the adhesive force between the seal tape 100 and the battery case may be improved. At this time, the sectional shape of the seal tape along the line A-A' may be shown as in FIG. 1. In addition, though not shown in the figures, the protective layer 130 may be formed in the upper portion of the second adhesive layer 120, namely the outermost side of the seal tape 100.

Meanwhile, the width, namely vertical length, of the seal tape 100 attached to the electrode assembly 10 may be variously configured. For example, assuming that the vertical length of the electrode assembly 10 is 60 mm, the vertical length of the seal tape 100 may be 50 mm. However, the present disclosure is not limited to such a specific attachment size of the seal tape 100, and the seal tape 100 may be attached to the electrode assembly 10 of various sizes.

Figure 6:
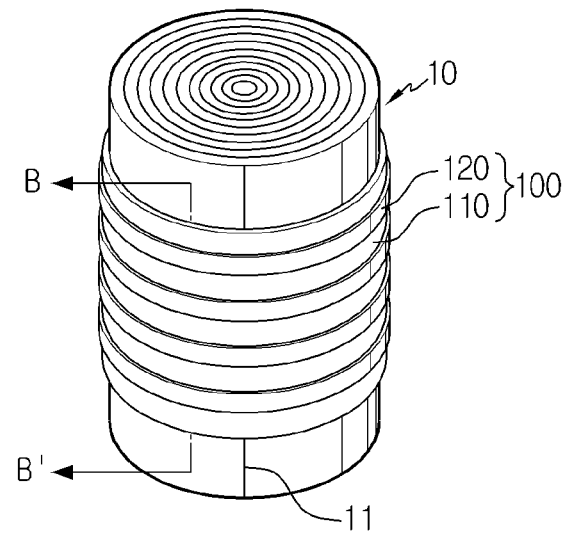
FIG. 6 is a schematic view showing the seal tape attached to an electrode assembly according to another embodiment of the present disclosure.

FIG. 6 is a schematic view showing the seal tape attached to an electrode assembly 10 according to another embodiment of the present disclosure.

As shown in FIG. 6, the seal tape 100 for a secondary battery attached to the outer surface of the electrode assembly 10 including the rolling end 11 may include a plurality of stripe-type second adhesive layers 120 attached to the outer surface thereof. In other words, the second adhesive layers 120 and the first adhesive layer 110 may have shapes and sizes different from each other. In this case, the substrate layer 140 may be provided between the first adhesive layer 110 and the second adhesive layer 120. In addition, in the case of the seal tape 100, the sectional shape along the line B-B' may be depicted as shown in FIG. 4. In addition, the protective layer 130 may be formed on the second adhesive layer 120.

Figure 7:
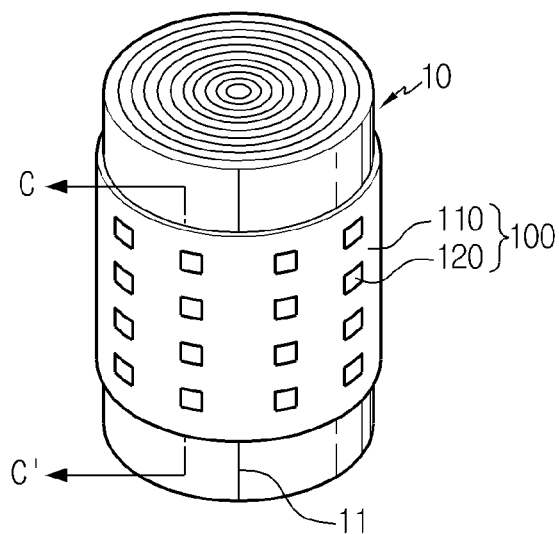
FIG. 7 is a schematic view showing the seal tape attached to an electrode assembly according to still another embodiment of the present disclosure.

FIG. 7 is a schematic view showing the seal tape attached to an electrode assembly 10 according to still another embodiment of the present disclosure.

As shown in FIG. 7, the seal tape 100 for a secondary battery according to the present disclosure may include a plurality of dot-type second adhesive layers 120 with a certain size and shape. At this time, each second adhesive layer 120 may be consistent by having same shapes such as a rectangle or a triangle or may have different shapes. In addition, in FIG. 7, like in the embodiment shown in FIG. 6, the substrate layer 140 may be provided between the first adhesive layer 110 and the second adhesive layer 120. In the case of the seal tape 100 of the embodiment shown in FIG. 7, the sectional shape along the line C-C' may be depicted as shown in FIG. 4, similar to FIG. 6. In addition, the protective layer 130 may be formed on the second adhesive layer 120.

Meanwhile, the configurations of the seal tape 100 for a secondary battery as shown in FIGS. 5 to 7 are just examples. It is obvious to those having ordinary skill in the art that the attachment state of the seal tape 100 to the electrode assembly 10 and the size, shape or the like of the second adhesive layer 120 may be variously modified, other than those shown in FIGS. 5 to 7.

Preferably, the seal tape 100 may swell by reacting with the electrolyte of the secondary battery. In this case, before the electrode assembly 10 to which the seal tape 100 is attached is inserted into the battery case, the seal tape 100 does not react with the electrolyte, and therefore the seal tape 100 does not swell and the electrode assembly 10 may be easily inserted into the battery case. In addition, if the electrode assembly 10 is inserted into the battery case and then the electrolyte is injected thereto, the seal tape 100 on the outer surface of the electrode assembly 10 reacts with the electrolyte and swells. The swelling of the seal tape 100 allows the second adhesive layer 120 located at the outmost side to more strongly adhere to the inner surface of the battery case. Therefore, in a case where the seal tape 100 swells as in the above embodiment, the seal tape 100 and the battery case may adhere more strongly and easily. In addition, if the seal tape 100 swells, the impact transferred to the electrode assembly 10 from the outside of the battery case may be relieved.

The seal tape 100 may swell by reacting with the electrolyte in various ways. For example, the first adhesive layer 110 and/or the second adhesive layer 120 may react with the electrolyte and swell. In this case, the first adhesive layer 110 and/or the second adhesive layer 120 may be made of polyacrylate. In other cases, the first adhesive layer 110 and/or the second adhesive layer 120 may be made of poly methyl methacrylate (PMMA), poly ethyl methacrylate (PEMA), or poly butyl methacrylate (PBMA). In addition, the substrate layer 140 may react with the electrolyte and swell. In this case, the substrate layer 140 may be made of porous polymer material so that it may swell as it absorbs the electrolyte when impregnated with the electrolyte. The present disclosure is not limited to a detailed swelling shape of the seal tape 100, and the seal tape 100 may swell in various shapes. In addition, for this purpose, the first adhesive layer 110, the second adhesive layer 120 or the substrate layer 140 may be made of various materials.

Figure 8:
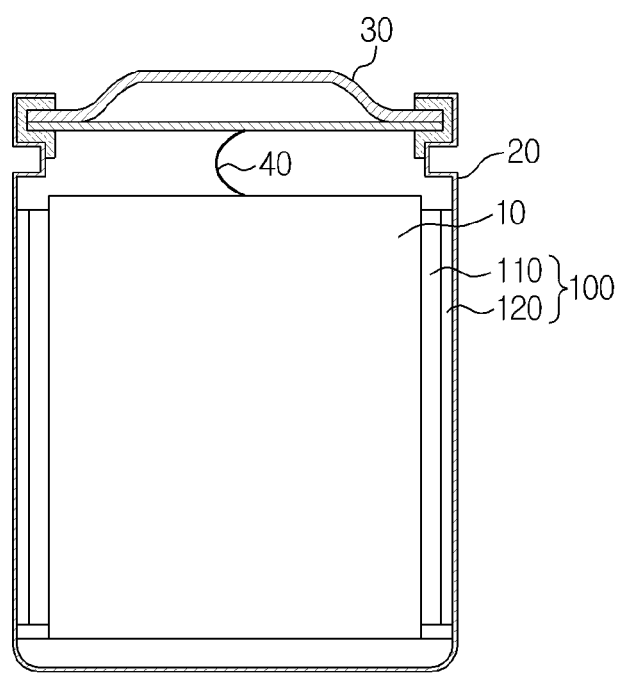
FIG. 8 is a cross-sectional view schematically showing a secondary battery according to an embodiment of the present disclosure.

FIG. 8 is a cross-sectional view schematically showing a secondary battery according to an embodiment of the present disclosure.

Referring to FIG. 8, the secondary battery according to the present disclosure includes an electrode assembly 10, a battery case 20 and a seal tape 100.

The electrode assembly 10 includes a cathode plate and an anode plate disposed with a separator being interposed between them and rolled in a jelly roll shape, and the electrode assembly 10 is received in the battery case 20. In addition, the seal tape 100 is attached to the outer surface of the electrode assembly 10 including the rolling end 11.

The battery case 20 receives the electrolyte together with the electrode assembly 10. The battery case 20 may generally have a cylindrical or rectangular shape, and FIG. 8 shows that the battery case 20 has a cylindrical shape.

The seal tape 100 has an adhesive layer and adheres to the outer surface of the electrode assembly 10 and the inner surface of the battery case 20. In more detail, the seal tape 100 has a first adhesive layer 110 and a second adhesive layer 120, where the first adhesive layer 110 is an adhesive layer adhered to the outer surface of the electrode assembly 10, and the second adhesive layer 120 is an adhesive layer having an adhesive surface opposite to the adhesive surface of the first adhesive layer 110 and adhered to the inner surface of the battery case 20.

As described above, since the seal tape 100 according to the present disclosure includes the first adhesive layer 110 and the second adhesive layer 120, it may adhere to the electrode assembly 10 and the battery case 20 and prevent the electrode assembly 10 from moving. Therefore, it is possible to prevent the movement of the electrode assembly 10 from cutting an electrode lead 40, deforming or damaging the electrode assembly 10, separating or damaging a cap assembly 30, and consequently making the electrolyte leak.

Meanwhile, the first adhesive layer 110 and the second adhesive layer 120 may be made of the same adhesive material, and at this time, the first adhesive layer 110 and the second adhesive layer 120 will exhibit as a single adhesive layer without being distinguished.

Preferably, the second adhesive layer 120 and the secondary battery may be made of material which exhibits an adhesive property by reacting with the electrolyte. In other words, the second adhesive layer 120 of the seal tape 100 may not have an adhesive property before it reacts with the electrolyte and preferably have an adhesive property after it reacts with the electrolyte. In this case, the electrode assembly 10 to which the seal tape 100 is attached may be easily inserted into the battery case 20 as described above.

More preferably, the second adhesive layer 120 may be made of OPS material. In other words, the second adhesive layer 120 may be an OPS film. In a case where the second adhesive layer 120 is an OPS film as described above, the second adhesive layer 120, namely the OPS film, generally does not have an adhesive property, but it may have an adhesive property by reacting with a certain component such as the DMC of the electrolyte. Therefore, if the electrode assembly 10 according to the present disclosure to which the seal tape 100 is attached is inserted into the battery case 20 and then the electrolyte is injected thereto, the adhesive property of the OPS film is exhibited so that the OPS film may adhere to the inner surface of the battery case 20.

In addition, the second adhesive layer 120 may be made of thermosetting adhesive material. Therefore, when the electrode assembly 10 is inserted into the battery case 20, the adhesive property of the second adhesive layer 120 is not exhibited, and the adhesive property of the second adhesive layer 120 may be exhibited by applying heat more than the predetermined level to the inside of the battery case 20 after the electrode assembly 10 is inserted into the battery case 20. Therefore, when the electrode assembly 10 is inserted into the battery case 20, it is possible to prevent the inserting process from being disturbed due to the adhesive characteristic of the second adhesive layer 120.

In addition, the seal tape 100 may further include the protective layer 130 on the second adhesive layer 120. The protective layer 130 may be entirely or partially removed by reacting with the electrolyte. At this time, the configuration where the protective layer 130 is entirely removed from the seal tape 100 attached to the electrode assembly 10 is identical to FIG. 8.

In this embodiment, since the protective layer 130 is present in the upper portion of the second adhesive layer 120, namely at the outermost side of the seal tape 100, the adhesive surface of the seal tape 100 is not exposed. Therefore, the electrode assembly 10 may be inserted into the battery case 20 without any special difficulty. In addition, if the electrolyte is injected after the electrode assembly 10 is inserted into the battery case 20, the protective layer 130 reacts with the electrolyte and is removed, and therefore the second adhesive layer 120 is exposed at last so that the seal tape 100 and the battery case 20 adheres to each other.

At this time, the protective layer 130 of the seal tape 100 may be an OPS film made of OPS material.

In addition, the protective layer 130 of the seal tape 100 may have an adhesive property entirely or partially by reacting with the electrolyte. In this case, the adhesive force of the second adhesive layer 120 and the protective layer 130 is reinforced, and therefore the adhesion between the seal tape 100 and the battery case 20 may become stronger.

In addition, though not shown in FIG. 8, the substrate layer 140 may be further included between the first adhesive layer 110 and the second adhesive layer 120.

Preferably, the seal tape 100 may swell by reacting with the electrolyte.

Figure 9:
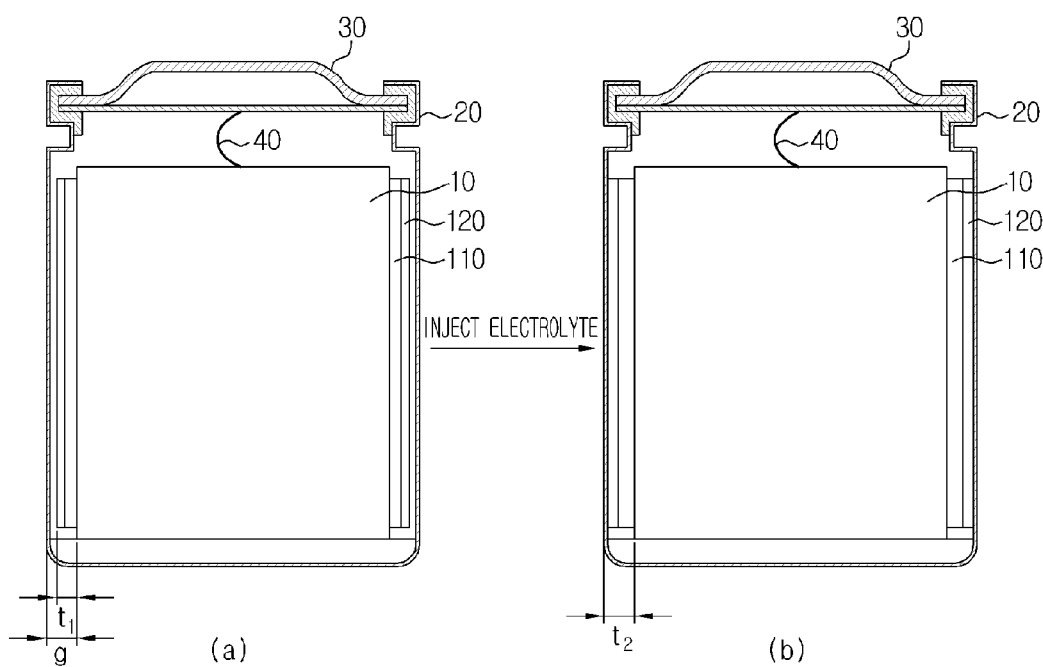
FIG. 9 is a cross-sectional view schematically showing the seal tape swelling before and after the electrolyte is injected according to an embodiment of the present disclosure.

FIG. 9 is a cross-sectional view schematically showing the seal tape 100 swelling before and after the electrolyte is injected according to an embodiment of the present disclosure. In FIG. 9, (a) represents the configuration of the seal tape 100 before the electrolyte is injected into the secondary battery, and (b) of FIG. 9 represents the configuration of the seal tape 100 after the electrolyte is injected into the secondary battery.

Referring to (a) of FIG. 9, before the electrolyte is injected, the thickness of the seal tape 100 attached to the electrode assembly 10 is t1, which is smaller than a gap g between the electrode assembly 10 and the battery case 20. Therefore, the electrode assembly 10 to which the seal tape 100 is attached may be easily inserted into the battery case 20.

Meanwhile, referring to (b) of FIG. 9, in a case where the electrolyte is injected into the battery case 20, the tape 100 reacts with the electrolyte so that its thickness t2 may be equal to or greater than the gap g between the electrode assembly 10 and the battery case 20. However, since the gap between the electrode assembly 10 and the battery case 20 is given, the increase in thickness as described above increases the adhesion of the seal tape 100 between the first adhesive layer 110 and the electrode assembly 10, and the adhesion of the seal tape 100 between the second adhesive layer 120 and the battery case 20. Therefore, as a result, the electrode assembly 10 is strongly adhered to the battery case 20, thereby more securely preventing the electrode assembly 10 from moving.

Meanwhile, though FIGS. 8 and 9 illustrate the secondary battery where a beading portion is formed at the battery case 20, the present disclosure may also be applied to a secondary battery having no beading portion.

Figure 10:
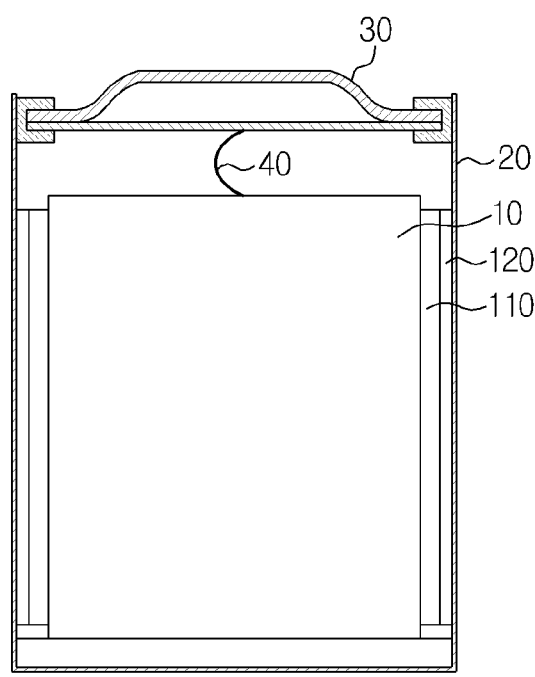
FIG. 10 is a cross-sectional view schematically showing a secondary battery having no beading portion according to another embodiment of the present disclosure.

FIG. 10 is a cross-sectional view schematically showing the secondary battery having no beading portion according to another embodiment of the present disclosure.

Referring to FIG. 10, different from FIGS. 8 and 9, a beading portion is not provided to the battery case 20. In the case of the secondary battery having no beading portion as described above, the electrode assembly 10 may easily move vertically. Therefore, a power insensitive phenomenon or other problems such as firing and explosion tend to easily occur due to the cutting of the electrode lead 40 or the damage of the electrode assembly 10. In addition, the cap assembly 30 is coupled with the battery case 20 by means of welding or the like, and, if an impact is applied to the lower portion of the cap assembly 30 due to the movement of the electrode assembly 10, the coupling portion may break, which may cause the electrolyte to leak or the cap assembly 30 to separate.

However, in a case where the seal tape 100 according to the present disclosure is attached to the electrode assembly 10 and inserted into the battery case 20, the first adhesive layer 110 and the second adhesive layer 120 are strongly adhered to the electrode assembly 10 and the battery case 20 to prevent the electrode assembly 10 from moving. Therefore, various problems caused by the movement of the electrode assembly 10 in the secondary battery having no beading portion may definitely be prevented.

Meanwhile, even though the above embodiments have been illustrated based on a cylindrical secondary battery, the present disclosure is not limited to such a specific shape of the secondary battery. For example, the present disclosure may be applied to a rectangular secondary battery and a pouch type secondary battery.

Figure 11:
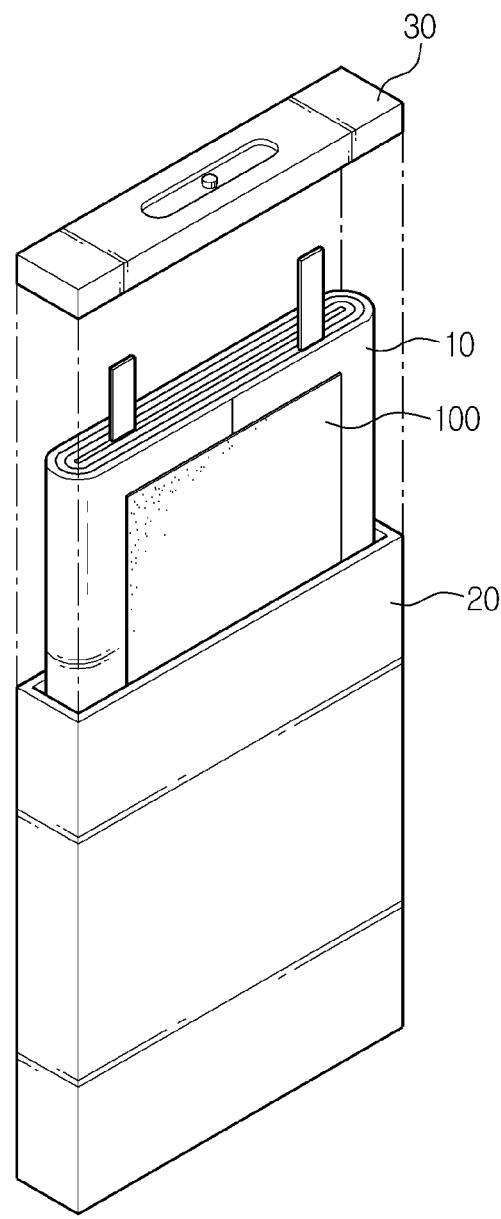
FIGS. 11 and 12 are schematic views showing a secondary battery according to still another embodiment of the present disclosure.
Figure 12:
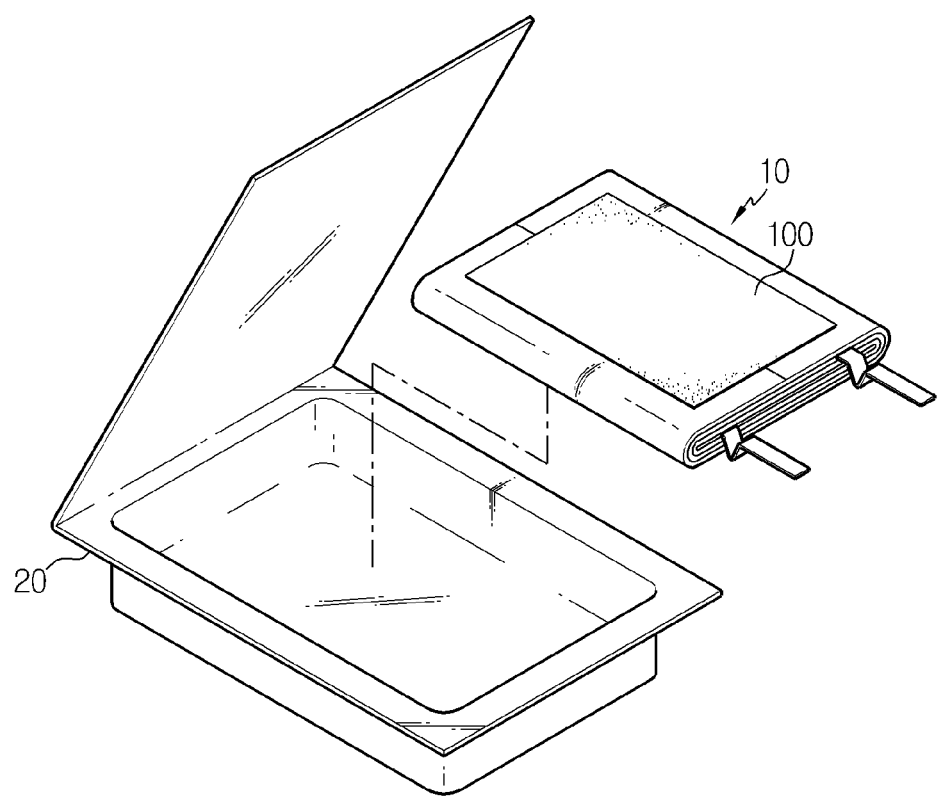

FIGS. 11 and 12 are schematic views showing a secondary battery according to still another embodiment of the present disclosure.

Referring to FIG. 11, the seal tape 100 is attached to the outer surface of the electrode assembly 10 rolled in a rectangular shape, and the electrode assembly 10 to which the seal tape 100 is attached as described above is received in the rectangular battery case 20 together with the electrolyte and is then closed by the cap assembly 30, according to the present disclosure. At this time, the seal tape 100 attached to the electrode assembly 10 may be attached to the inner surface of the rectangular battery case 20 by the second adhesive layer 120, similar to the cylindrical battery, thereby preventing the electrode assembly 10 from moving in the battery case 20.

Referring to FIG. 12, the electrode assembly 10 to outer surface of which the seal tape 100 is attached is received in the pouch type battery case 20 according to the present disclosure. In other words, after the electrode assembly 10 is received in a space formed in the lower pouch, the secondary battery may be configured so that the upper pouch covers the received electrode assembly 10. Here, the seal tape 100 according to the present disclosure may also be attached to the electrode assembly 10 of the pouch type secondary battery. In this case, the seal tape 100 attached to the outer surface of the electrode assembly 10 may be attached to the inner surface of the pouch by the second adhesive layer 120 to prevent the electrode assembly 10 from moving in the pouch, namely in the battery case 20.

Meanwhile, the rectangular secondary battery and the pouch type secondary battery shown in FIGS. 11 and 12 are just examples, and it is apparent to those having ordinary skill in the art that they may be implemented in various ways.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A seal tape for a secondary battery, the battery comprising:
    a battery case, an electrolyte and an electrode assembly, wherein the seal tape is attached to an outer surface of the electrode assembly, which is received in the battery case, the seal tape comprising:
    (1) a first adhesive layer having an adhesive surface adhered to the outer surface of the electrode assembly; and
    (2) a second adhesive layer having an adhesive surface at a side opposite to the adhesive surface of the first adhesive layer so as to adhere to an inner surface of the battery case,
    wherein the second adhesive layer comprises a thermally activated thermosetting adhesive material at the adhesive surface.

2. The seal tape for a secondary battery according to claim 1, further comprising a protective layer formed on the second adhesive layer, wherein the protective layer is entirely or partially removed by reacting with an electrolyte of the secondary battery.

3. The seal tape for a secondary battery according to claim 2, wherein the protective layer entirely or partially has an adhesive property by reacting with the electrolyte.

4. The seal tape for a secondary battery according to claim 2, wherein the protective layer is made of OPS material.

5. The seal tape for a secondary battery according to claim 1, further comprising a substrate layer between the first adhesive layer and the second adhesive layer.

6. A secondary battery, comprising:
    an electrode assembly including a cathode plate and an anode plate disposed with a separator being interposed between them;
    a battery case receiving the electrode assembly and an electrolyte; and
    a seal tape attached to an outer surface of the electrode assembly, the seal tape comprising:
    (1) a first adhesive layer adhered to an outer surface of the electrode assembly; and
    (2) a second adhesive layer with an adhesive surface formed at a side opposite to the adhesive surface of the first adhesive layer so as to adhere to an inner surface of the battery case,
    wherein the second adhesive layer comprises a thermally activated thermosetting adhesive material at the adhesive surface.

7. The secondary battery according to claim 6, wherein the seal tape further includes a protective layer which is formed on the second adhesive layer and is entirely or partially removed by reacting with the electrolyte.

8. The secondary battery according to claim 7, wherein the protective layer entirely or partially has an adhesive property by reacting with the electrolyte.

9. The secondary battery according to claim 7, wherein the protective layer is made of OPS material.

10. The secondary battery according to claim 6, wherein the seal tape further includes a substrate layer between the first adhesive layer and the second adhesive layer.

11. The secondary battery according to claim 6, wherein the battery case is free from a beading portion.

* * * * *